(12) United States Patent
Tanaka et al.

(10) Patent No.: US 6,768,006 B2
(45) Date of Patent: Jul. 27, 2004

(54) PHTHALOCYANINE CRYSTAL, PRODUCTION PROCESS THEREFOR, AND ELECTROPHOTOGRAPHIC PHOTOSENSITIVE MEMBER, PROCESS CARTRIDGE AND APPARATUS USING THE CRYSTAL

(75) Inventors: Masato Tanaka, Shizuoka-ken (JP); Hidetoshi Hirano, Shizuoka-ken (JP); Kan Tanabe, Susono (JP); Kazue Asakura, Shizuoka-ken (JP); Atsushi Fujii, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 10/226,341

(22) Filed: Aug. 23, 2002

(65) Prior Publication Data

US 2003/0054273 A1 Mar. 20, 2003

Related U.S. Application Data

(62) Division of application No. 09/771,714, filed on Jan. 30, 2001, now Pat. No. 6,447,967.

(30) Foreign Application Priority Data

Jan. 31, 2000  (JP) ..................................... 2000/022611

(51) Int. Cl.⁷ .......................... G03G 5/06; C09B 67/04
(52) U.S. Cl. ...................... 540/141; 399/111; 399/116; 430/59.4; 430/78; 430/83
(58) Field of Search ........................ 430/59.4, 78, 83; 399/111, 116; 540/141

(56) References Cited

U.S. PATENT DOCUMENTS

| | | | |
|---|---|---|---|
| 4,898,799 A | 2/1990 | Fujimaki et al. | 430/59 |
| 5,302,479 A | 4/1994 | Daimon et al. | 430/78 |
| 5,358,813 A | 10/1994 | Iijima et al. | 430/59 |
| 5,518,539 A | 5/1996 | Hao et al. | 106/495 |
| 5,663,327 A | 9/1997 | Tambo et al. | 540/139 |
| 5,885,737 A | 3/1999 | Tanaka | 430/59 |
| 5,985,505 A | 11/1999 | Lincoln et al. | 430/135 |
| 6,225,015 B1 | 5/2001 | Okaji et al. | 430/59.5 |

FOREIGN PATENT DOCUMENTS

| | | |
|---|---|---|
| EP | 0 654 506 | 5/1995 |
| EP | 0 803 546 | 10/1997 |
| EP | 0 835 912 | 4/1998 |
| JP | 61-217050 | 9/1986 |
| JP | 61-239248 | 10/1986 |
| JP | 62-067094 | 3/1987 |
| JP | 63-218768 | 9/1988 |
| JP | 64-17066 | 1/1989 |
| JP | 02-285146 | 6/1992 |
| JP | 5-98181 | 4/1993 |
| JP | 5-263007 | 10/1993 |
| JP | 7-331107 | 12/1995 |
| JP | 8-100134 | 4/1996 |
| JP | 9-111148 | 4/1997 |
| JP | 9-124967 | 5/1997 |
| JP | 10-7927 | 1/1998 |
| JP | 10-17784 | 1/1998 |
| JP | 10-67946 | 3/1998 |
| JP | 10-155445 | 12/1999 |

OTHER PUBLICATIONS

European Search Report dated Jul. 16, 2001 (Ref. No. EP 29867).

Primary Examiner—Peter G O'Sullivan
(74) Attorney, Agent, or Firm—Fitzpatrick, Cella, Harper & Scinto

(57) ABSTRACT

An electrophotographic photosensitive member exhibiting a high sensitivity and a potential stability on repetitive use and capable of suppressing image defects, such as black spots in a reversal development scheme, is provided. The photosensitive member includes a support, and a phthalocyanine layer formed on the support and a novel phthalocyanine crystal, which comprises a phthalocyanine compound and a substituted or unsubstituted condensed polycyclic hydrocarbon compound.

23 Claims, 9 Drawing Sheets

PHTHALOCYANINE CRYSTAL, PRODUCTION PROCESS THEREFOR, AND ELECTROPHOTOGRAPHIC PHOTOSENSITIVE MEMBER, PROCESS CARTRIDGE AND APPARATUS USING THE CRYSTAL

This application is a divisional application of U.S. patent application Ser. No. 09/771,714, filed Jan, 30, 2001, now U.S. Pat. No. 6,447,967.

FIELD OF THE INVENTION AND RELATED ART

The present invention relates to a novel phthalocyanine crystal, a process for producing the phthalocyanine crystal, an electrophotographic photosensitive member using the phthalocyanine crystal, and a process cartridge and an electrophotographic apparatus including the photosensitive member.

As photoconductor materials for electrophotographic photosensitive members, inorganic photoconductors, such as cadmium sulfide, and zinc oxide, have been conventionally used. On the other hand, organic photoconductors, such as polyvinyl carbazole, oxadiazole, azo pigments and phthalocyanine have advantages of non-pollution characteristic and high productivity compared with the inorganic photoconductors but generally have a low conductivity so that the commercialization thereof has been difficult. For this reason, various sensitizing methods have been proposed, and among them, the use of a unction separation-type photosensitive member including a charge generation layer and a charge transport layer in a laminated state has become predominant and has been commercialized.

On the other hand, in recent years, non-impact-type printers utilizing electrophotography have come into wide in place of conventional impact-type printers as terminal printers. Such non-impact-type printers principally comprise laser beam printers using laser light as exposure light, and as the light source thereof, semiconductor lasers have been predominantly used, in view of the cost and apparatus size thereof. The semiconductor lasers principally used currently have an oscillating wavelength in a long wavelength region of 650–820 nm, so that electrophotographic photosensitive members having a sufficient sensitivity in such a long wavelength region have been developed.

Phthalocyanine compounds are very effective charge generating materials having a sensitivity up to such a long wavelength region, and compared with conventional phthalocyanine compounds and polyvinyl carbazole, oxytitanium phthalocyanine and gallium phthalocyanine are known to have better sensitivities, and various crystal forms thereof have been disclosed, e.g., in Japanese Laid-Open Patent Application (JP-A) 61-239248, JP-A 61-217050, JP-A 62-67094, JP-A 63-218768, JP-A 64-17066, JP-A 5-98181, JP-A 5-263007 and JP-A 10-67946.

Further, it has been known that a phthalocyanine compound of even a similar crystal form can exhibit remarkably different electrophotographic performances, particularly in sensitivity and chargeability, when used in an electrophotographic photosensitive member depending on production process factors, such as starting materials and solvents, and production conditions, such as reaction temperatures and starting material charging ratios.

Production processes for gallium phthalocyanine crystals have been disclosed in, e.g., JP-A 8-100134, JP-A 9-111148, JP-A 9-124967, JP-A 10-7927 and JP-A 10-17784. Further, JP-A 7-331107 discloses a hydroxygallium phthalocyanine crystal containing a polar solvent, such as N,N-dimethylformamide. Electrophotographic photosensitive members using these gallium phthalocyanine crystals are liable to exhibit a fluctuation in electrophotographic performances depending on production lots and do not necessarily have satisfactory sensitivity, potential stability in repetitive use and chargeability in view of requirements for higher speed and higher image quality in electrophotography in recent years.

Further, while having an excellent sensitivity to long-wavelength region, an electrophotographic photosensitive member using a phthalocyanine compound is accompanied with difficulties, such as fluctuation in electrophotographic performances depending on production lots and liability of image defect (sometimes called "black spots"), that is, black spotty fog occurring in a white background region in a reversal development system, due to local charge injection, particularly in a high temperature/high humidity environment. Further, the photosensitive member is accompanied with a difficulty that its light-part potential is liable to be fluctuated on repetitive use.

SUMMARY OF THE INVENTION

In view of the above-mentioned problems of the prior art, a principal object of the present invention is to provide an electrophotographic photosensitive member exhibiting a high-sensitivity characteristic particularly in a semiconductor wavelength region, exhibiting a stable potential characteristic on repetitive used and capable of reducing image defects, particularly backspots in a reversal development scheme.

A further object of the present invention is to provide a novel phthalocyanine crystal capable of providing such a photosensitive member and a process for producing the phthalocyanine crystal.

A still further object of the present invention is to provide a process cartridge and an electrophotographic apparatus including the photosensitive member.

According to the present invention, there is provided a phthalocyanine crystal, comprising: a phthalocyanine compound and a substituted or unsubstituted condensed polycyclic hydrocarbon compound.

The present invention further provides some processes for producing the above-mentioned phthalocyanine crystal.

The present invention also provides an electrophotographic photosensitive member comprising a support, and a photosensitive layer disposed on the support and containing the above-mentioned phthalocyanine crystal.

The present invention further provides a process cartridge and an electrophotographic apparatus respectively including the above-mentioned electrophotographic photosensitive member.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
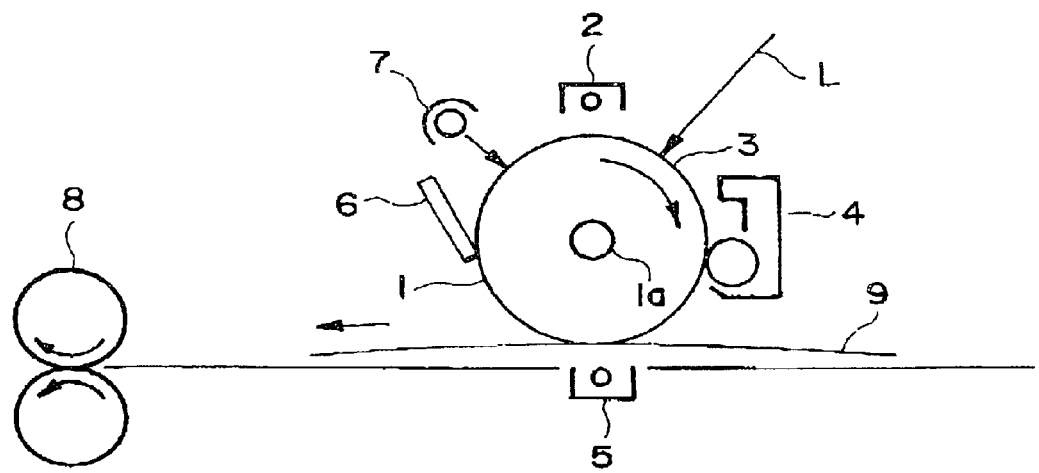
FIG. 1 is a schematic illustration of an electrophotographic apparatus including an electrophotographic photosensitive member according to the invention.

The phthalocyanine crystal of the present invention comprises a phthalocyanine compound and a minor amount of substituted or unsubstituted condensed polycyclic hydrocarbon compound.

However, even if the phthalocyanine crystal of the present invention is heated up to the melting point of the substituted or unsubstituted condensed polycyclic hydrocarbon compound, the hydrocarbon compound is not liberated from the phthalocyanine crystal. Further, even if the phthalocyanine crystal of the present invention is analyzed by liquid chromatography, the presence of the hydrocarbon compound is not detected. From these facts, it is believed that the hydrocarbon compound is not merely attached to the phthalocyanine compound but is firmly held within the phthalocyanine crystal.

Examples of the condensed polycyclic hydrocarbon compound constituting the phthalocyanine crystal of the present invention may include: pentalene, indene, naphthalene, azulene, heptalene, biphenylene, indacene, acenaphthylene, fluorene, phenalene, phenanthrene, anthracene, fluoroanthene, pyrene, naphthacene, picene and perylene. Naphthalene is particularly preferred.

Examples of the substituent optionally possessed by the above condensed polycyclic hydrocarbon compound may include: alkyl groups, such as methyl and ethyl; alkoxy groups, such as methoxyl and ethoxyl; alkylamino groups, such as dimethylamino and diethylamino; nitro, cyano, haloalkyl groups such as trifluoromethyl; halogen atoms, such as chorine, fluorine and iodine. Halogen atoms are particularly preferred.

Among the above-enumerated substituted or unsubstituted condensed polycyclic hydrocarbon compounds, α-chloronaphthalene and naphthalene are particularly preferred.

The substituted or unsubstituted condensed polycyclic hydrocarbon compound may preferably be contained in a proportion of 100–50000 ppm based on the total weight of the phthalocyanine crystal. Outside this range, it becomes difficult to attain the remarkable effect of the present invention.

The phthalocyanine compound constituting the phthalocyanine crystal of the present invention may comprise any forms of phthalocyanines inclusive of non-metallic phthalocyanine, metal phthalocyanines capable of having an axial ligand. The phthalocyanine compound can also have a substituent and can have any crystal form. In order for the phthalocyanine crystal of the present invention to exhibit a particularly excellent sensitivity characteristic, the phthalocyanine compound may preferably comprise gallium phthalocyanine. Further, in the state containing the substituted or unsubstituted condensed polycyclic hydrocarbon compound, the phthalocyanine crystal of the present invention may preferably comprise hydroxygallium phthalocyanine crystal having crystal forms characterized by strong peaks at Bragg angles 2θ of 7.4 deg. ±0.2 deg. and 28.2 deg. ±0.2 deg. (i.e., any crystal forms each characterized by an X-ray diffraction pattern showing a peaktop in a range of 7.2–7.6 deg. and a peaktop in a range of 28.0–28.4 deg.) according to CuKα characteristic X-ray diffractometry. Among these, a crystal form characterized by strong peaks at Bragg angles 2θ±0.2 deg. of 7.3 deg., 24.9 deg. and 28.1 deg., and a crystal form characterized by strong peaks at Bragg angles 2θ±0.2 deg. of 7.5 deg., 9.9 deg., 16.3 deg., 18.6 deg., 25.1 deg. and 28.3 deg. (Herein, "±0.2 deg." in "2θ±0.2 deg." represents an angle detection error generally recognized in X-ray diffractometry.)

The phthalocyanine crystal according to the present invention may be produced through various processes, inclusive of: a process comprising subjecting a phthalocyanine compound to an acid pasting step including dissolving or dispersing the phthalocyanine compound in an acid in mixture with a substituted or unsubstituted condensed polycyclic hydrocarbon compound; a process comprising subjecting a phthalocyanine compound to an acid pasting step including dissolving or dispersing a phthalocyanine compound in an acid to form a mixture, and adding the mixture into a solution containing a substituted or unsubstituted condensed polycyclic hydrocarbon compound; and a process comprising subjecting a crystal transformation step including milling a phthalocyanine compound within a solvent containing a substituted or unsubstituted condensed polycyclic hydrocarbon compound.

Herein, the acid pasting step means a step of treating a phthalocyanine compound including dissolving or dispersing the phthalocyanine compound in an acid, adding the resultant solution or dispersion into an aqueous medium to re-precipitate a phthalocyanine solid, optionally washing the phthalocyanine solid with an alkaline aqueous solution and washing the phthalocyanine solid with de-ionized water. The washing with deionized water may preferably be repeated until the after-washing water is caused to have a conductivity of at most 20 μS. The acid used may for example be sulfuric acid, hydrochloric acid and trifluoroacetic acid, and conc. sulfuric acid is particularly preferred. The acid may preferably be used in an amount of 10–40 times the weight of the phthalocyanine compound. The phthalocyanine compound may preferably be dissolved or dispersed in the acid at a temperature of at most 50° C. so as to avoid the decomposition or reaction with the acid of the phthalocyanine compound. The substituted or unsubstituted condensed polycyclic hydrocarbon compound may preferably be used in an amount of 0.01–2 times the weight of the phthalocyanine compound in the case of dissolving or dispersing the phthalocyanine compound in the acid already mixed with the substituted or unsubstituted condensed polycyclic hydrocarbon compound, or 0.01–10 times the weight of the phthalocyanine compound in the case of adding the mixture of the phthalocyanine compound with the acid into an aqueous medium containing the substituted or unsubstituted condensed polycyclic hydrocarbon compound As mentioned above, the phthalocyanine crystal according to the present invention can also be produced through a process comprising a step of milling a phthalocyanine compound within a solvent containing a substituted or unsubstituted condensed polycyclic hydrocarbon compound.

The milling may be performed within a milling apparatus, such as a sand mill or a ball mill, wherein the phthalocyanine compound is milled together with dispersion media, such as glass beads, steel beads and alumina balls, in the presence of a solvent containing a substituted or unsubstituted condensed polycyclic hydrocarbon compound. The milling time can vary depending on the milling apparatus used but may preferably be on the order of 4–48 hours. It is preferred to check the crystal form by CuKα characteristic X-ray diffractometry for measuring the Bragg angles at an interval of 4–8 hours each during the milling. The dispersion medium may preferably be used in a weigh which is 10–50 times the phthalocyanine compound. Examples of the solvent used in the milling may include: amide solvents, such as N,N-dimethylformamide, N,N-dimethylacetamide, N-methylformamide, N-methylacetamide and N-methylpropioamide; halide solvents, such as chloroform; ether solvents, such as tetrahydrofuran; and sulfoxide solvents, such as dimethyl sulfoxide. The solvent may preferably be used in an amount of 10–30 times the weight of the phthalocyanine compound. The substituted or unsubstituted condensed polycyclic hydrocarbon compound may preferably be used in an amount of 0.01–3 times the weight of the phthalocyanine compound.

The X-ray diffraction data referred to herein for determining the crystal form of phthalocyanine crystals are based on data measured by X-ray diffractometry using $CuK_\alpha$ characteristic X-rays according to the following conditions:

Apparatus: Full-automatic X-ray diffraction apparatus ("MXP18", available from MAC Science K.K.)

X-ray tube (Target): Cu

Tube voltage: 50 kV

Tube current: 300 mA

Scanning method: 2θ/θ scan

Scanning speed: 2 deg./min.

Sampling interval: 0.020 deg.

Starting angle (2θ): 5 deg.

Stopping angle (2θ): 40 deg.

Divergence slit: 0.5 deg.

Scattering slit: 0.5 deg.

Receiving slit: 0.3 deg.

Curved monochromator: used.

Next, some embodiments of application of the phthalocyanine crystal according to the present invention as a charge-generating material in the electrophotographic photosensitive member will be described.

The electrophotographic photosensitive member according to the present invention may have a laminar structure including a single photosensitive layer containing both a charge-generating material and a charge-transporting material formed on an electroconductive support, or alternatively a laminar photosensitive layer including a charge generation layer containing a charge-generating material and a charge transport layer containing a charge-transporting material formed successively on an electroconductive support. The order of lamination of the charge generation layer and the charge transport layer can be reversed. It is however preferred that the charge generation layer is disposed below the charge transport layer.

The electroconductive support may comprise any material exhibiting electroconductivity, examples of which may include: metals, such as aluminum, aluminum alloys, copper, zinc, stainless steel, vanadium, molybdenum, chromium, titanium, nickel, indium, gold and platinum. In addition, it is also possible to use a support comprising a plastic substrate of, e.g., polyethylene, polypropylene, polyvinyl chloride, polyethylene terephthalate, acrylic resin or polyethylene fluoride, and a coating film formed thereon of a conductor such as aluminum, aluminum alloys, indium oxide, tin oxide or indium tin oxide, formed by vacuum deposition; a support comprising a plastic substrate or a support as mentioned above further coated with a conductive coating layer comprising electroconductive particles of, e.g., aluminum, titanium oxide, tin oxide, zinc oxide, carbon black or silver, together with an appropriate binder; a support comprising a plastic or paper impregnated with electroconductive particles, or a plastic support comprising an electroconductive polymer.

It is possible to dispose an undercoating layer having a barrier function and an adhesive function between the support and the photosensitive layer. The undercoating layer may comprise a material, such as polyvinyl alcohol, polyethylene oxide, ethyl cellulose, methyl cellulose, casein, polyamide (e.g., nylon 6, nylon 66, nylon 610, copolymer nylon and N-alkoxymethylated nylon), polyurethane, glue, aluminum oxide or gelatine. The under coating layer may preferably have a thickness of 0.1–10 μm, particularly 0.5–5 μm.

The single photosensitive layer may be formed by applying a coating liquid comprising a mixture of the phthalocyanine crystal according to the present invention as a charge-generating material and a charge-transporting material within a solution of a binder resin on the support optionally coated with the undercoating layer, etc., followed by drying of the coating liquid.

For providing the laminated photosensitive layer, the charge generation layer may be formed by application of a coating liquid formed by dispersing the phthalocyanine crystal according to the present invention in a solution of an appropriate binder, followed by drying of the coating liquid, but can also be formed by vacuum deposition of the phthalocyanine crystal.

The charge transport layer may be formed by application of a coating liquid formed by dissolving a charge transporting material and a binder resin in a solvent, followed by drying of the coating liquid. Examples of the charge-transporting material may include: various triarylamine compounds, hydrazone compounds, stilbene compounds, pyrazoline compounds, oxazole compounds, thiazole compounds, and triarylmethane compounds.

Examples of the binder resin for providing the respective layers may include: polyester, acrylic resin, polyvinylcarbazole, phenoxy resin, polycarbonate, polyvinyl butyral, polystyrene, polyvinyl acetate, polysulfone, polyarylate, polyvinylidene chloride, arylonitrile copolymer and polyvinylbenzal.

For the formation of the photosensitive layers, various coating methods may be adopted, inclusive of dipping, spray coating, spinner coating, bead coating, blade coating and beam coating.

A photosensitive layer of a single-layer structure may preferably have a thickness of 5–40 μm, particularly 10–30 μm. In a laminated photosensitive layer structure, the charge generation layer may preferably have a thickness of 0.01–10 μm, particularly 0.1–3 μm, and the charge transport layer may preferably have a thickness of 5–40 μm, particularly 10–30 μm.

The charge-generating material may preferably be contained in 20–90 wt. %, more preferably 50–80 wt. %, of the charge generation layer. The charge-transporting material may preferably be contained in 20–80 wt. %, more preferably 30–70 wt. % of the charge transport layer. In the case of a single photosensitive layer, the charge-generating material may preferably contained in 3–30 wt. %, and the charge-transporting material may preferably be contained in 30–70 wt. %, respectively of the photosensitive layer.

The phthalocyanine crystal of the present invention may be used as such a charge-generating material and can be used in mixture with another charge-generating material. In the latter case, the phthalocyanine crystal may preferably occupy at least 50 wt. % of the total charge generating materials.

The photosensitive layer can be further coated with a protective layer as desired. Such a protective layer may be formed in a thickness of preferably 0.05–20 $\mu$m by application of a solution in an appropriate solvent of a resin, such as polyvinyl butyral, polyester, polycarbonate (polycarbonate Z, modified polycarbonate, etc.), nylon, polyimide, polyarylate, polyurethane, styrene-butadiene copolymer, ethylene-acrylic acid copolymer, styrene-acrylonitrile copolymer, or curable resin precursor, followed by drying and optional curing. The protective layer can further contain electroconductive particles of, e.g., metal oxides, such as tin oxide, an ultraviolet absorber, etc.

Next, some description will be made on the electrophotographic apparatus according to the present invention.

Referring to FIG. 1, a photosensitive member 1 in the form of a drum is rotated about an axis 1a at a prescribed peripheral speed in the direction of the arrow shown inside of the photosensitive member 1. The peripheral surface of the photosensitive member 1 is uniformly charged by means of a primary charger 2 to have a prescribed positive or negative potential. At an exposure part 3, the photosensitive member 1 is imagewise exposed to light L (as by slit exposure or laser beam-scanning exposure) by using an image exposure means (not shown), whereby an electrostatic latent image is successively formed corresponding to the exposure pattern on the surface of the photosensitive member 1. The thus formed electrostatic latent image is developed by using a developing means 4 to form a toner image. The toner image is successively transferred to a transfer(-receiving) material 9 which is supplied from a supply part (not shown) to a position between the photosensitive member 1 and a transfer charger 5 in synchronism with the rotation speed of the photosensitive member 1, by means of a corona transfer charger 5. The transfer material 9 carrying the toner image thereon is separated from the photosensitive member 1 to be conveyed to a fixing device 8, followed by image fixing to print out the transfer material 9 as a copy outside the electrophotographic apparatus. Residual toner particles remaining on the surface of the photosensitive member 1 after the transfer operation are removed by a cleaning means 6 to provide a cleaned surface, and residual charge on the surface of the photosensitive member 1 is erased by a pre-exposure means 7 to prepare for the next cycle.

Figure 2:
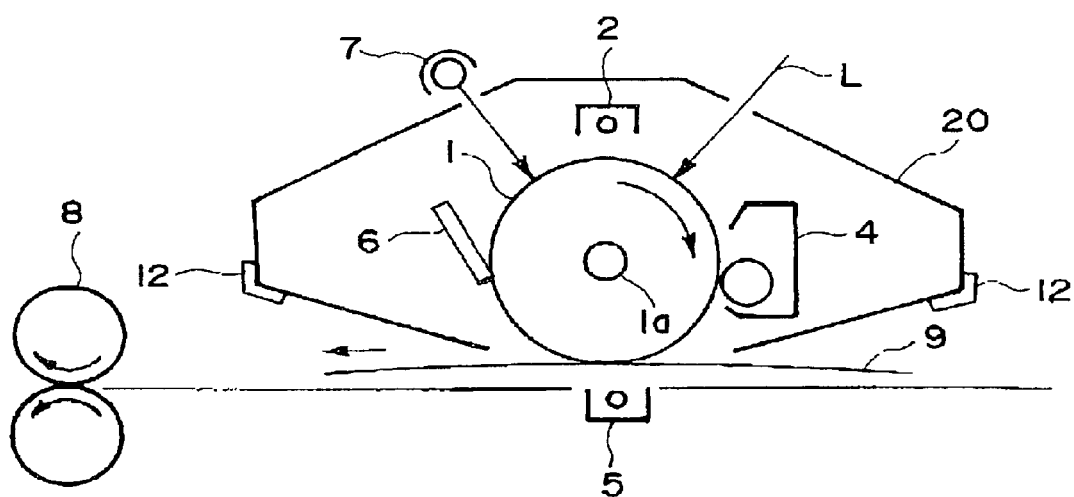
FIGS. 2 to 4 are schematic illustrations of electrophotographic apparatus including different types of process cartridges each including an electrophotographic photosensitive member according to the invention.

FIG. 2 shows an electrophotographic apparatus wherein an electrophotographic photosensitive member 1, a charging means 2 and a developing means 4 are integrally stored in a container 20 to form a process cartridge, which is detachably mountable to a main assembly of the electrophotographic apparatus by the medium of a guiding means, such as a rail of the main assembly. A cleaning means 6 may be disposed as shown or not disposed within the container 20.

Figure 3:
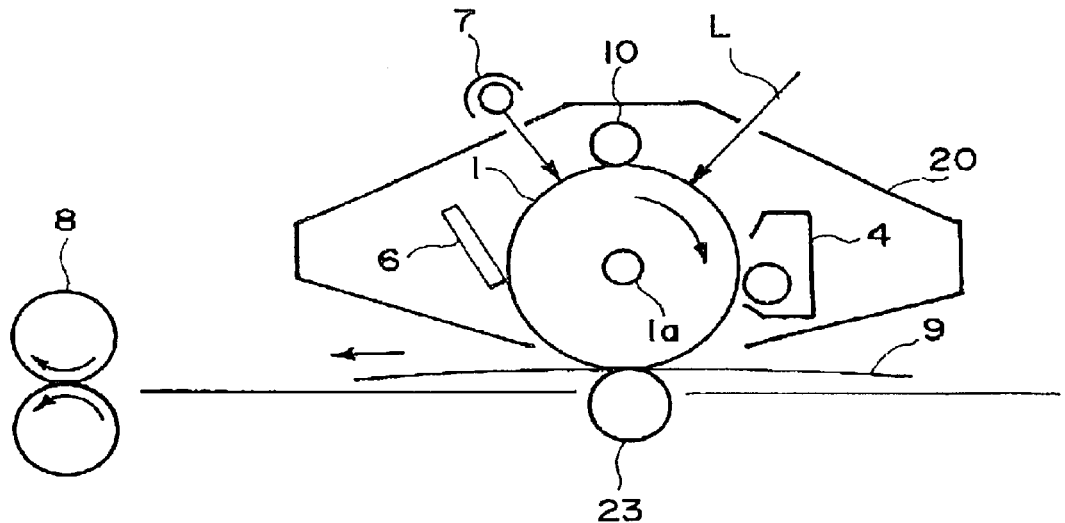
Figure 4:
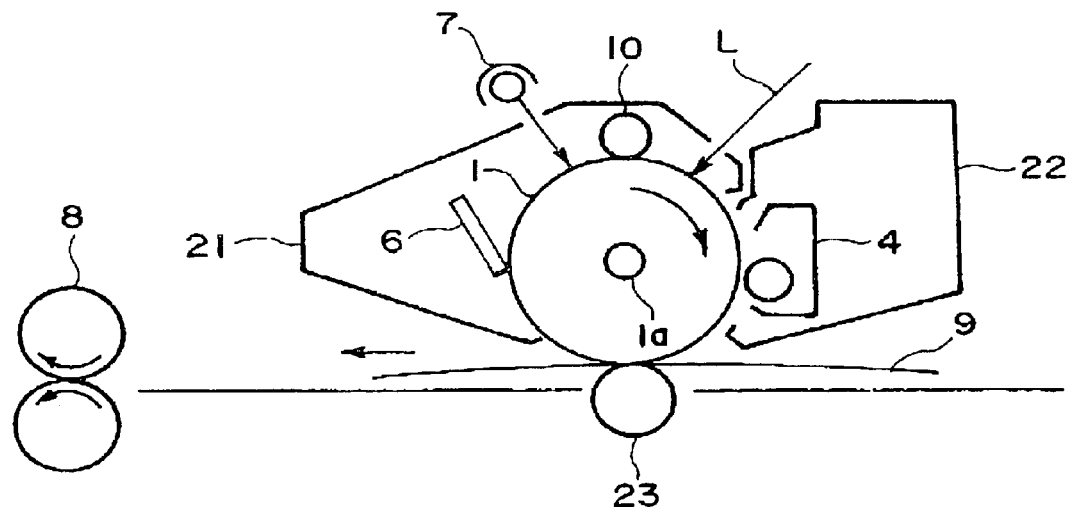

FIGS. 3 and 4 show other embodiments of the electrophotographic apparatus according to the present invention including different forms of process cartridges wherein a contact charging member 10 supplied with a voltage as a charging means is caused to contact a photosensitive member 1 to charge the photosensitive member 1. In the apparatus of FIGS. 3 and 4, toner images on the photosensitive member 1 are transferred onto a transfer material P also by means of a contact charging member 23. More specifically, a contact charging member 23 supplied with a voltage is caused to contact a transfer material, whereby a toner image on the photosensitive member 1 is transferred onto the transfer material 9.

Further, in the apparatus of FIG. 4, at least the photosensitive member 1 and the contact charging member 10 are stored within a first container 21 to form a first process cartridge, and at least the developing means 4 is stored within a second container 22 to form a second process cartridge; so that the first and second process cartridges are detachably mountable to the main assembly of the electrophotographic apparatus. A cleaning means 6 may be disposed as shown or not disposed within the container 21. In the case where the electrophotographic apparatus constitutes a copying machine or a printer, the exposure light L may be provided as reflected light or transmitted light from an original, or alternatively provided as image-carrying illumination light formed by reading an original by a sensor, converting the read data into signals and driving a laser beam scanner, an LED array or a liquid crystal shutter array.

Hereinbelow, the present invention will be described more specifically with reference to Examples and Comparative Examples wherein "parts" and "%" used for describing a relative amount of a component or a material are by weight unless specifically noted otherwise.

SYNTHESIS EXAMPLE 1

Figure 5:
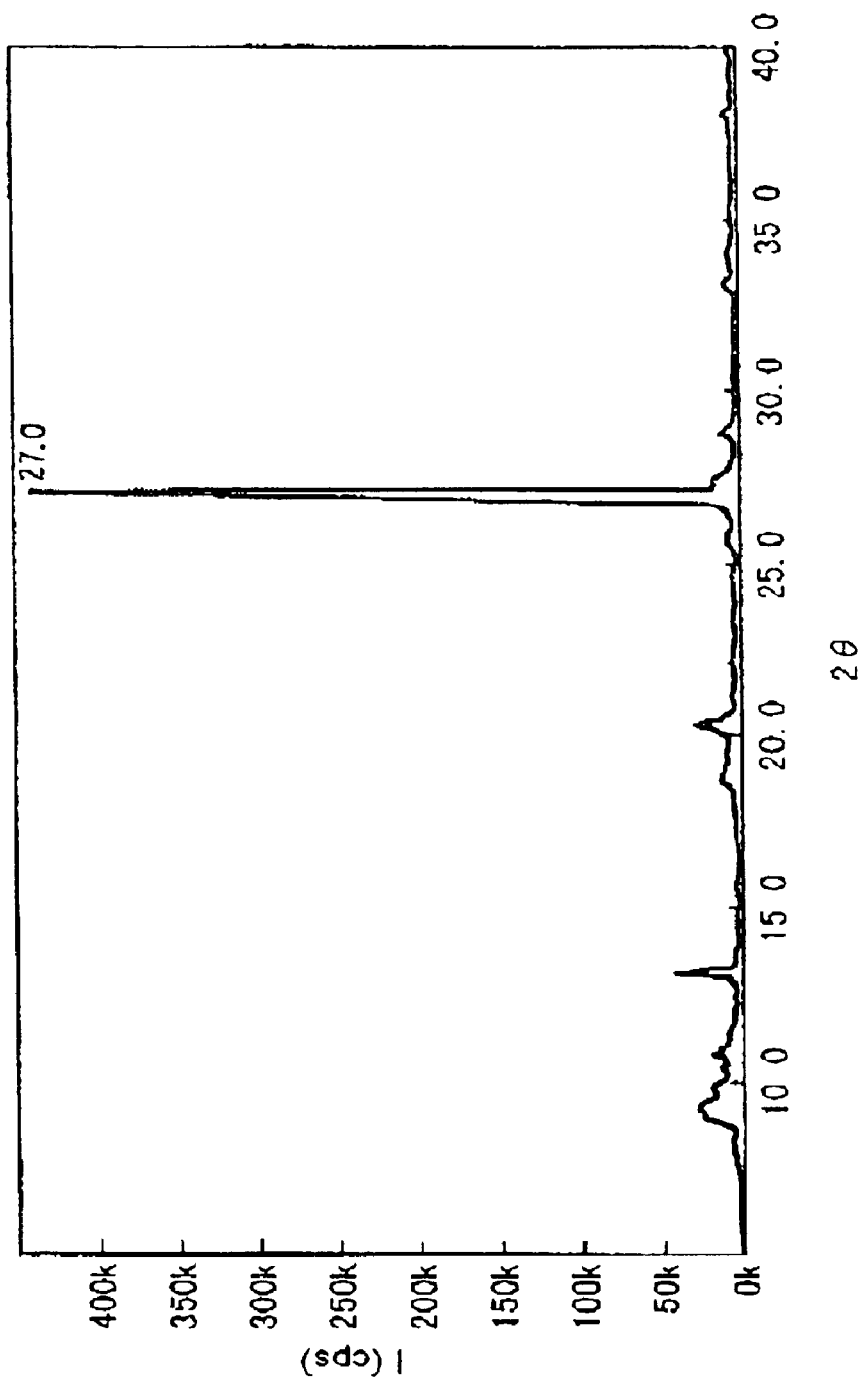
FIG. 5 is an X-ray diffraction chart of chlorogallium phthalocyanine obtained in Synthesis Example 1.

72 parts of o-phthalonitrile, 25 parts of gallium trichloride and 350 parts of quinoline were reacted with each other for 4 hours at 200° C. in a nitrogen atmosphere, followed by filtration at 130° C. to recover the product. The product was washed in dispersion within N,N-dimethylformamide at 140° C. for 2 hours, followed by filtration, washing with methanol and drying to obtain 32 parts (yield: 38.0%) of chlorogallium phthalocyanine crystal. The chlorogallium phthalocyanine crystal (represented by $C_{32}H_{16}ClGaN_8$) exhibited a powdery X-ray diffraction pattern as shown in FIG. 5 and the following results of elementary analysis.

| Element | Calculated (%) | Measured (%) |
| --- | --- | --- |
| C | 62.2 | 62.4 |
| H | 2.6 | 2.6 |
| N | 18.1 | 18.2 |
| Cl | 5.7 | 5.9 |

SYNTHESIS EXAMPLE 2

Figure 6:
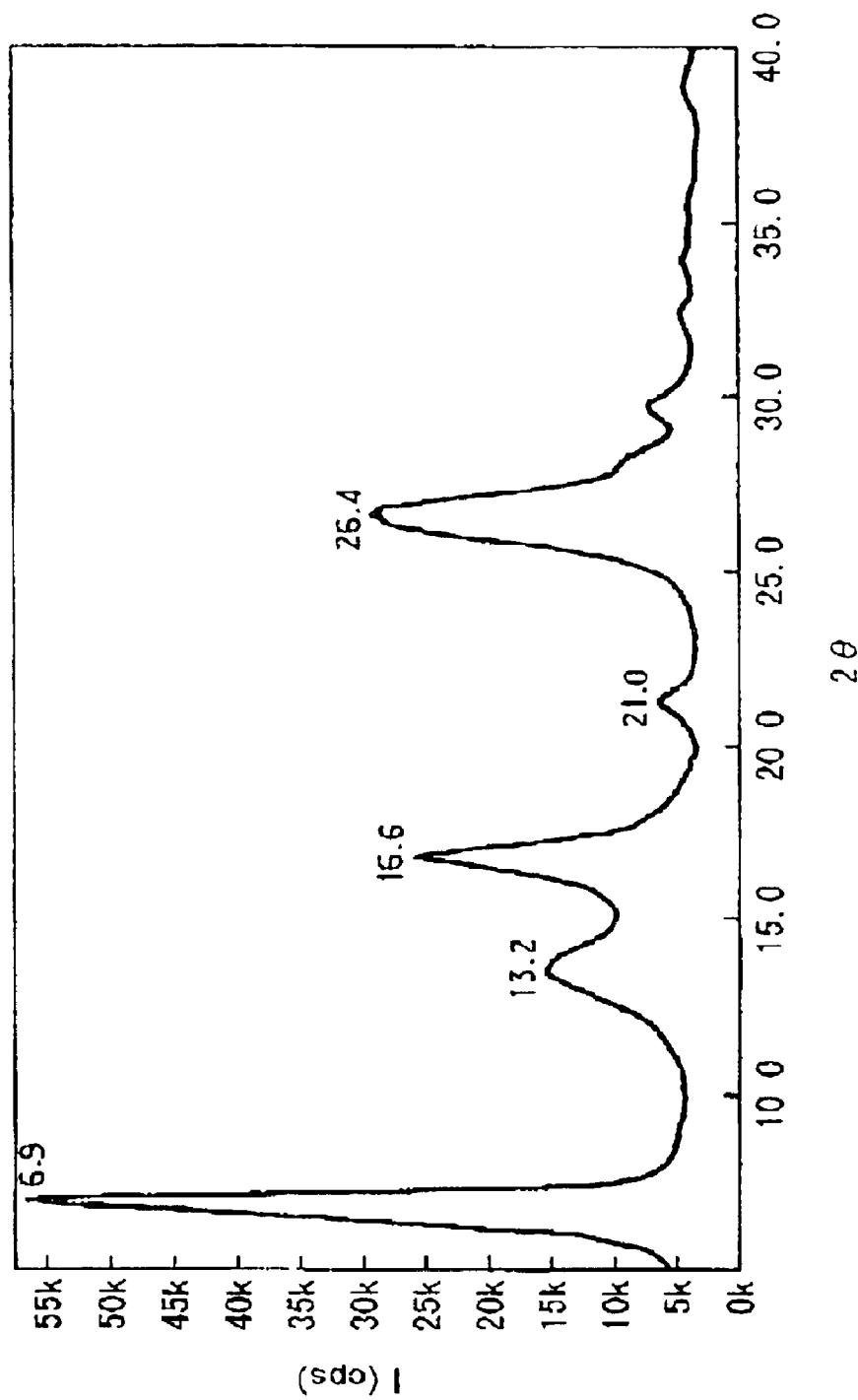
FIG. 6 is an X-ray diffraction chart of hydroxygallium phthalocyanine obtained in Synthesis Example 2.

15 parts of the chlorogallium phthalocyanine prepared in Synthesis Example 1 was dissolved in 300 parts of conc. sulfuric acid cooled at 15° C., and the resultant solution was added dropwise into 2000 parts of iced water under stirring to cause re-precipitation, followed by filtration. The precipitate was washed in dispersion first within 2% ammonia water and then four times within deionized water, and then dried in vacuum at 40° C. to obtain 13 parts of hydroxygallium phthalocyanine crystal. The hydroxygallium phthalocyanine crystal (represented by $C_{32}H_{17}GaN_8O$) exhibited a powdery X-ray diffraction pattern as shown in FIG. 6 and the following results of elementary analysis.

| Element | Calculated (%) | Measured (%) |
|---|---|---|
| C | 64.1 | 63.2 |
| H | 2.9 | 3.2 |
| N | 18.7 | 18.3 |
| Cl | 0.0 | 0.0 |

EXAMPLE 1

Figure 7:
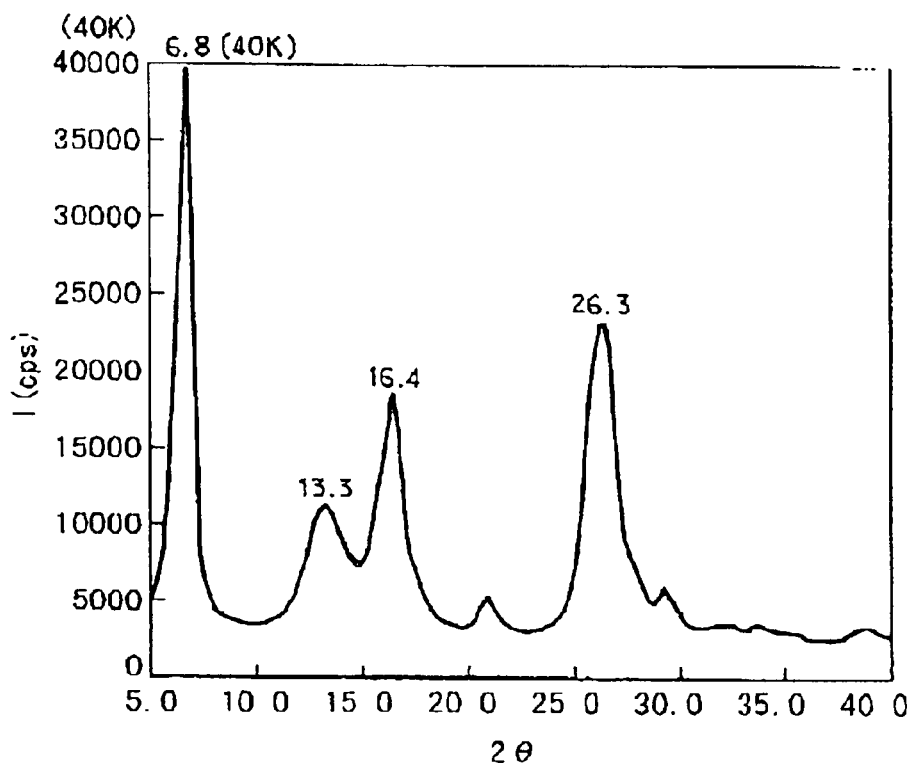
FIGS. 7–14 are X-ray diffraction charts of hydrogallium phthalocyanine crystals obtained in Examples 1–8, respectively.

15 parts of the chlorogallium phthalocyanine prepared in Synthesis Example 1 was dissolved in a mixture of 300 parts of conc. sulfuric acid and 1.5 parts (corresponding to 10% of the chlorogallium phthalocyanine) of α-chloronaphthalene (purity>85%, available from Tokyo Kasei Kogyo K.K.) cooled at 15° C., and the resultant solution was added dropwise into 2000 parts of iced water under stirring to cause re-precipitation, followed by filtration. The precipitate was washed in dispersion first within 2% ammonia water and then four times within deionized water, and then dried in vacuum at 40° C. to obtain 13 parts of hydroxygallium phthalocyanine crystal, which exhibited a powdery X-ray diffraction pattern as shown in FIG. 7.

EXAMPLE 2

Figure 8:
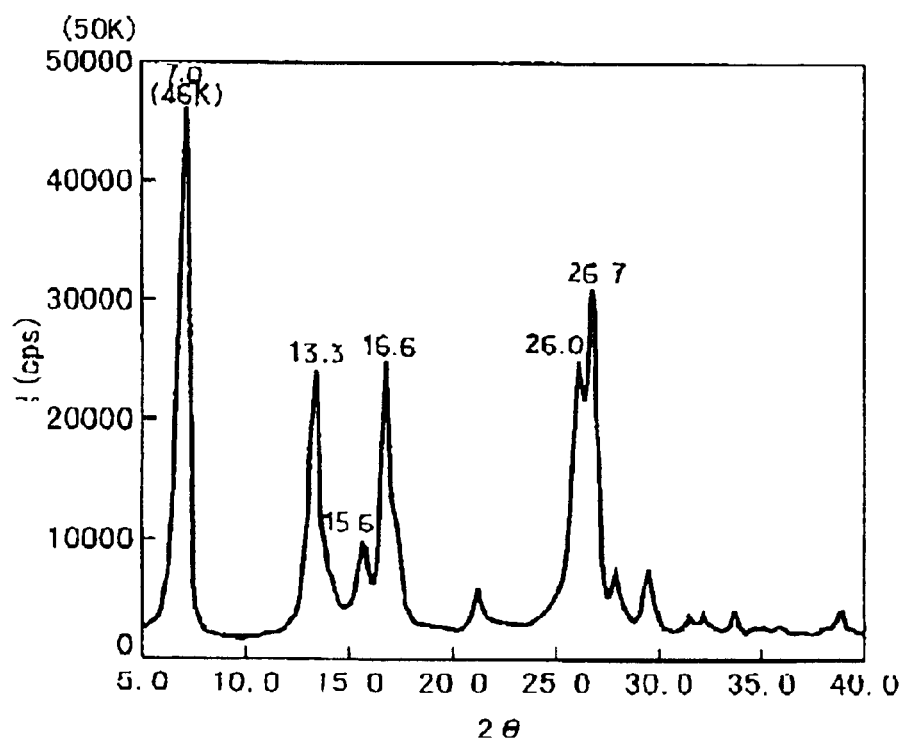

15 parts of the chlorogallium phthalocyanine prepared in Synthesis Example 1 was dissolved in 300 parts of conc. sulfuric acid cooled at 15° C., and the resultant solution was added dropwise into a mixture of 2000 parts of iced water and 15 parts (corresponding to 100% of the chlorogallium phthalocyanine) under stirring to cause re-precipitation, followed by filtration. The precipitate was washed in dispersion first within 2% ammonia water and then four times within deionized water, and then dried in vacuum at 40° C. to obtain 13 parts of hydroxygallium phthalocyanine crystal, which exhibited a powdery X-ray diffraction pattern as shown in FIG. 8.

EXAMPLE 3

Figure 9:
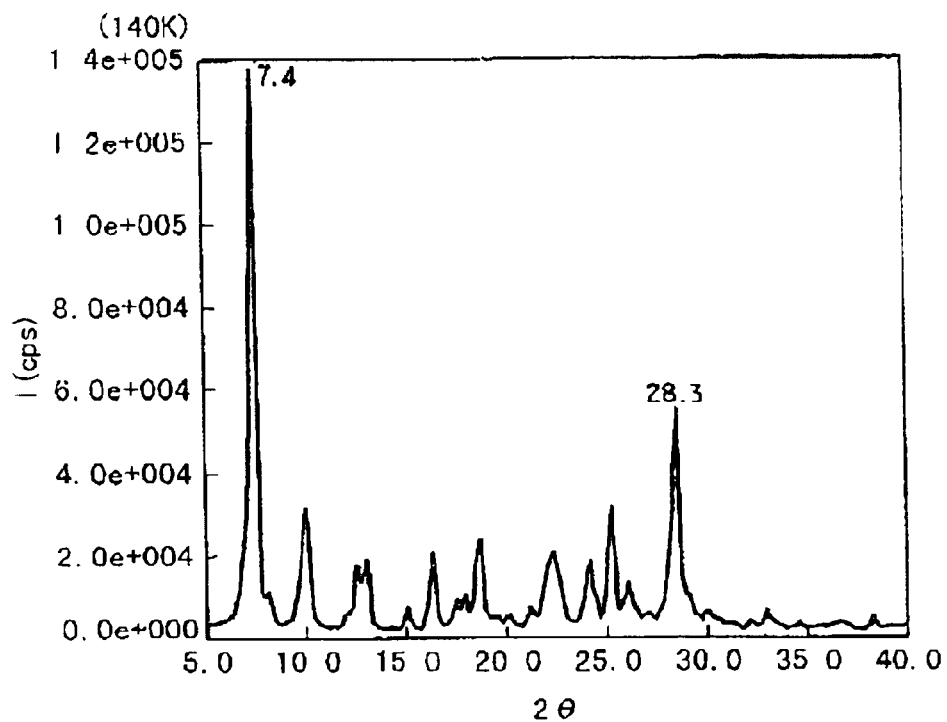

5 parts of the hydroxygallium phthalocyanine prepared in Example 1 and 95 parts of N,N-dimethylformamide were milled together with 150 parts of 1 mm-dia. glass beads for 20 hours at room temperature (24° C.) in a ball mill. The solid matter was recovered from the resultant dispersion, sufficiently washed with tetrahydrofuran, and dried, to obtain 4.5 parts of hydroxygallium phthalocyanine crystal. The hydroxygallium phthalocyanine crystal (as represented by $C_{32}H_{17}GaN_8O$ for convenience) exhibited an X-ray diffraction pattern as shown in FIG. 9 and the following results of elementary analysis. The measured value of Cl content indicated that 6845 ppm of α-chloronaphthalene was contained in the crystal.

| Element | Calculated (%) | Measured (%) |
|---|---|---|
| C | 64.1 | 63.5 |
| H | 2.9 | 3.0 |
| N | 18.7 | 18.3 |
| Cl | 0.0 | 0.150 |

EXAMPLE 4

Figure 10:
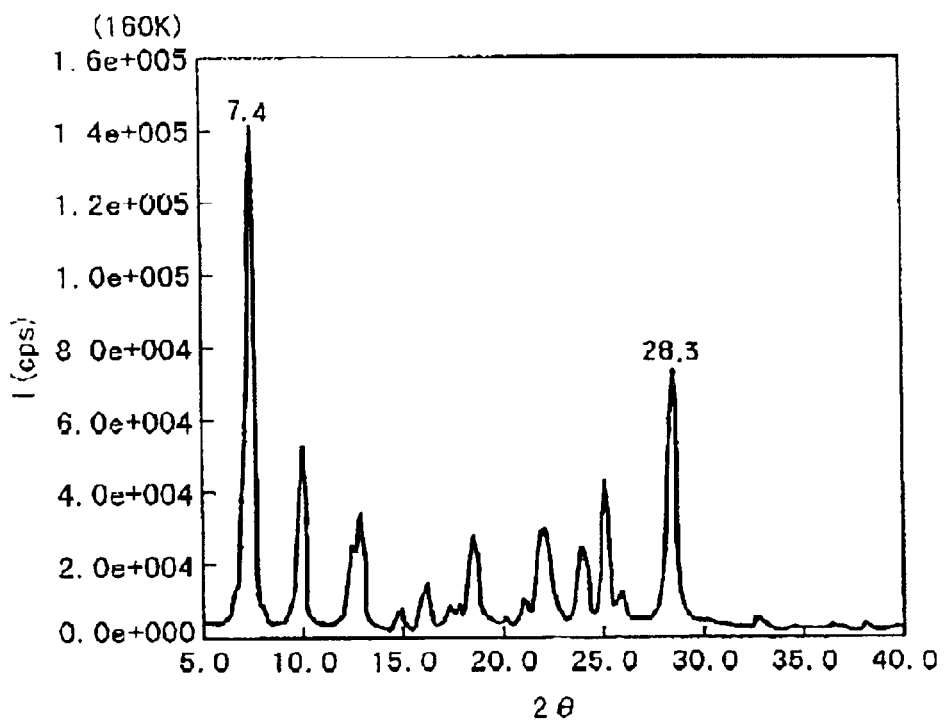

The hydroxygallium phthalocyanine prepared in Example 2 was subjected to milling and post-treatments similarly as in Example 3. The recovered hydroxygallium phthalocyanine crystal (as represented by $C_{32}H_{17}GaN_8O$) exhibited an X-ray diffraction pattern as shown in FIG. 10 and the following results of elementary analysis. The measured value of Cl content indicated that 7301 ppm of α-chloronaphthalene was contained in the crystal.

| Element | Calculated (%) | Measured (%) |
|---|---|---|
| C | 64.1 | 63.9 |
| H | 2.9 | 3.0 |
| N | 18.7 | 18.4 |
| Cl | 0.0 | 0.160 |

EXAMPLE 5

Figure 11:
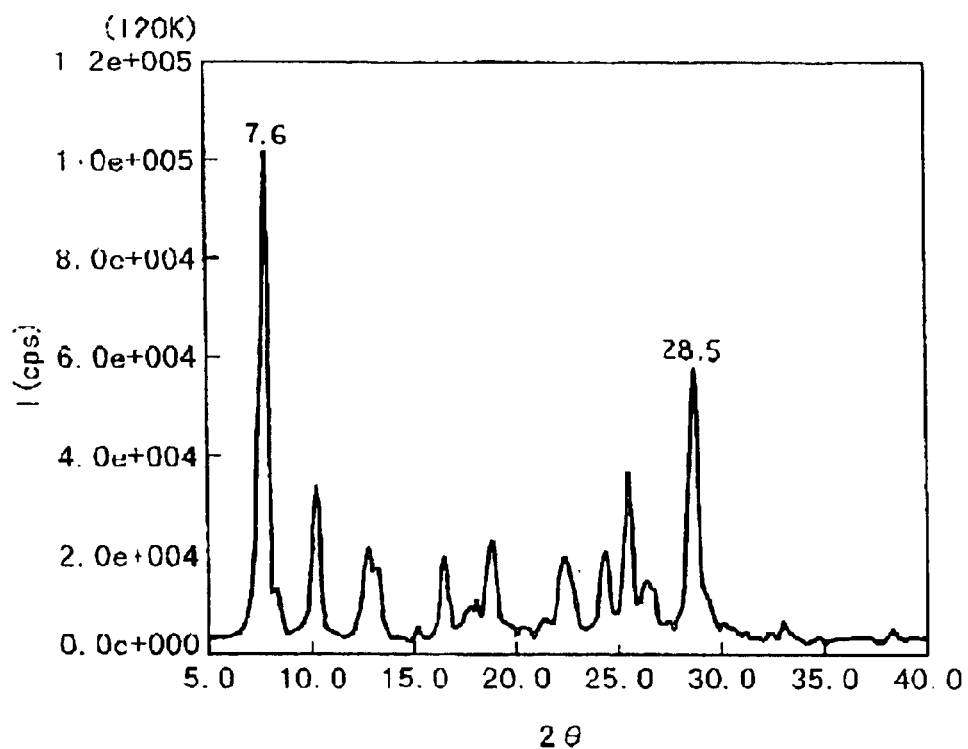

5 parts of the hydroxygallium phthalocyanine prepared in Synthesis Example 2, 95 parts of N,N-dimethylformamide and 0.5 part of α-chloronaphthalene were milled together with 150 parts of 1 mm-dia. glass beads for 20 hours at room temperature (24° C.) in a ball mill. The solid matter was recovered from the resultant dispersion, sufficiently washed with tetrahydrofuran, and dried, to obtain 4.5 parts of hydroxygallium phthalocyanine crystal. The hydroxygallium phthalocyanine crystal (as represented by $C_{32}H_{17}GaN_8O$) exhibited an X-ray diffraction pattern as shown in FIG. 11 and the following results of elementary analysis. The measured value of Cl content indicated that 3057 ppm of α-chloronaphthalene was contained in the crystal.

| Element | Calculated (%) | Measured (%) |
|---|---|---|
| C | 64.1 | 63.4 |
| H | 2.9 | 3.0 |
| N | 18.7 | 18.6 |
| Cl | 0.0 | 0.067 |

EXAMPLE 6

Figure 12:
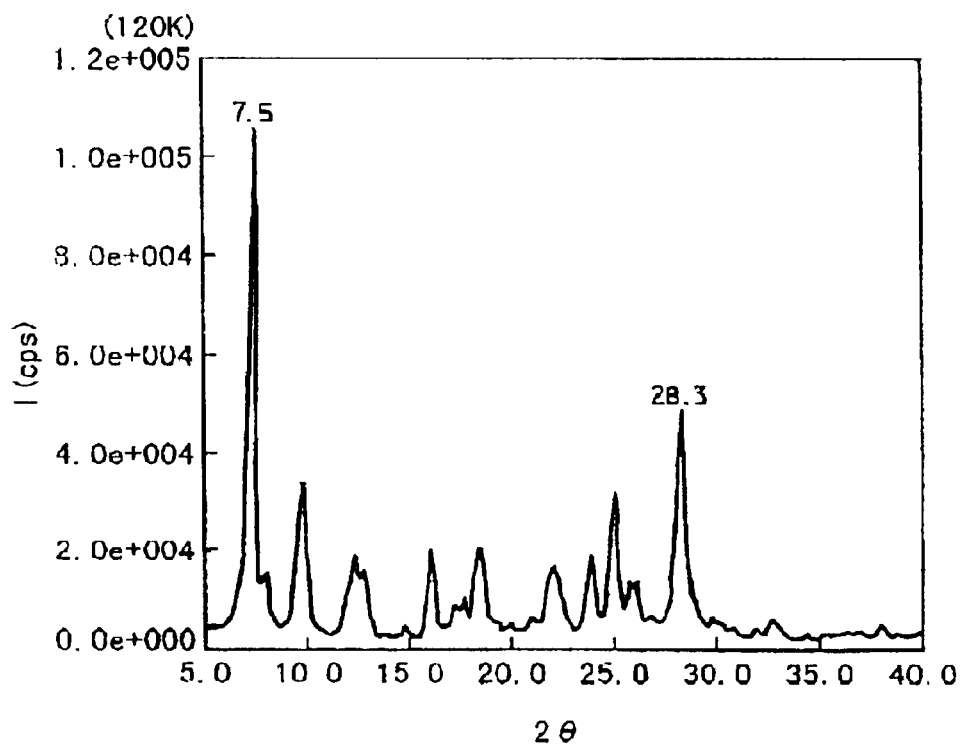

5 parts of the hydroxygallium phthalocyanine prepared in Synthesis Example 2, 95 parts of N,N-dimethylformamide and 5 parts of α-chloronaphthalene were milled together with 150 parts of 1 mm-dia. glass beads for 20 hours at room temperature (24° C.) in a ball mill. The solid matter was recovered from the resultant dispersion, sufficiently washed with tetrahydrofuran, and dried, to obtain 4.5 parts of hydroxygallium phthalocyanine crystal. The hydroxygallium phthalocyanine crystal (as represented by $C_{32}H_{17}GaN_8O$) exhibited an X-ray diffraction pattern as shown in FIG. 12 and the following results of elementary analysis. The measured value of Cl content indicated that 7073 ppm of α-chloronaphthalene was contained in the crystal. As a result of TG-GC/MS (thermogravimetry-gas chromatography/mass spectrometry) analysis in the range of 25° C.–500° C. (by using a TG-MS simultaneous measurement apparatus, available from K.K. Shimadzu Seisakosho), the crystal exhibited 6474 ppm of α-chloronaphthalene, 155 ppm of naphthalene, and 2.03% of N,N-dimethylformamide. The α-chloronaphthalene content was in good agreement with that calculated from the chlorine (Cl) content.

| Element | Calculated (%) | Measured (%) |
|---|---|---|
| C | 64.1 | 63.4 |
| H | 2.9 | 3.0 |
| N | 18.7 | 18.6 |
| Cl | 0.0 | 0.155 |

EXAMPLE 7

Figure 13:
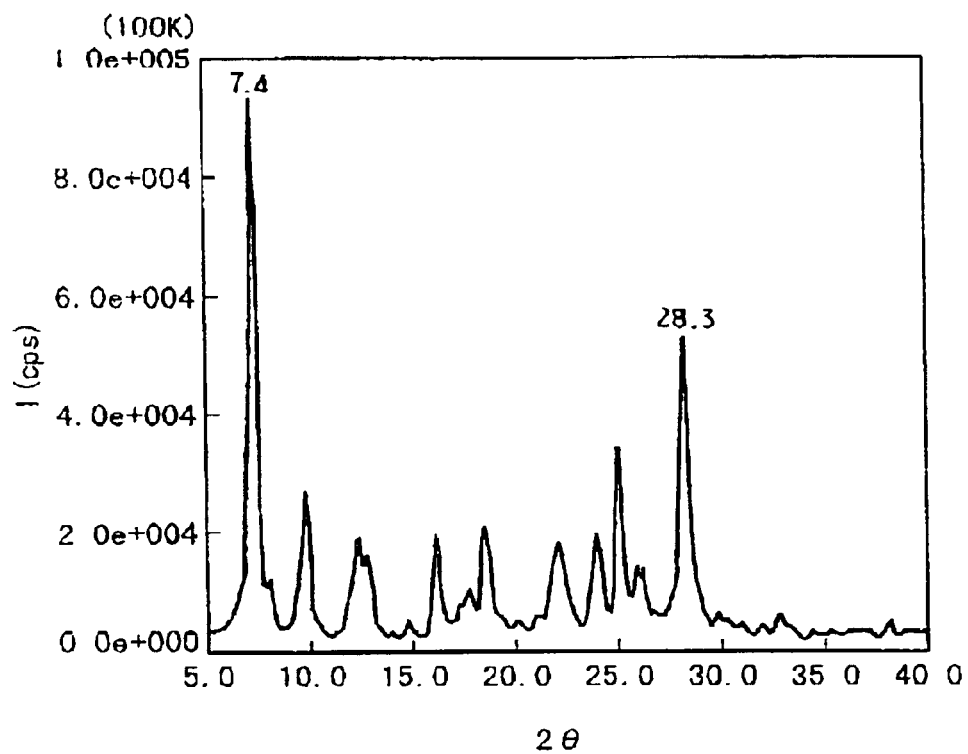

5 parts of the hydroxygallium phthalocyanine prepared in Synthesis Example 2, 95 parts of N,N-dimethylformamide and 0.5 part of naphthalene were milled together with 150 parts of 1 mm-dia. glass beads for 20 hours at room temperature (24° C.) in a ball mill. The solid matter was recovered from the resultant dispersion, sufficiently washed with tetrahydrofuran, and dried, to obtain 4.5 parts of hydroxygallium phthalocyanine crystal. The hydroxygallium phthalocyanine crystal (as represented by $C_{32}H_{17}GaN_8O$) exhibited an X-ray diffraction pattern as shown in FIG. 13 and the following results of elementary analysis. Further, as a result of the TG-GC/MS analysis (25–500° C.), the crystal exhibited 1500 ppm of naphthalene and 2.00% of N,N-dimethylformamide.

| Element | Calculated (%) | Measured (%) |
|---|---|---|
| C | 64.1 | 63.4 |
| H | 2.9 | 3.0 |
| N | 18.7 | 18.7 |
| Cl | 0.0 | 0.0 |

EXAMPLE 8

Figure 14:
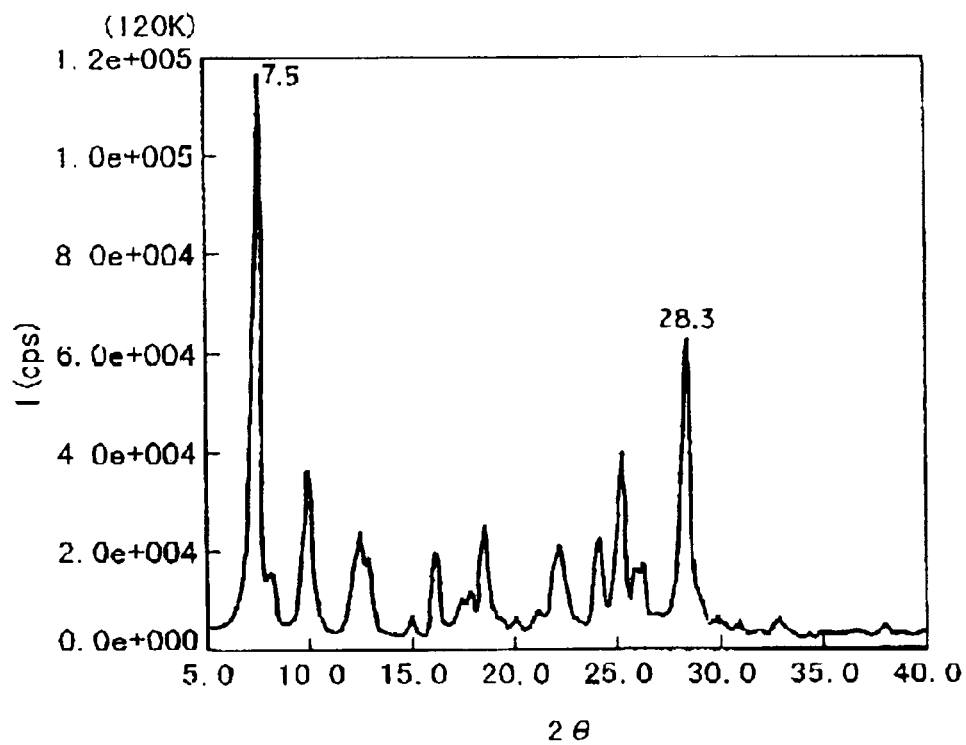

5 parts of the hydroxygallium phthalocyanine prepared in Synthesis Example 2, 95 parts of N,N-dimethylformamide and 5 parts of naphthalene were milled together with 150 parts of 1 mm-dia. glass beads for 20 hours at room temperature (24° C.) in a ball mill. The solid matter was recovered from the resultant dispersion, sufficiently washed with tetrahydrofuran, and dried, to obtain 4.5 parts of hydroxygallium phthalocyanine crystal. The hydroxygallium phthalocyanine crystal (as represented by $C_{32}H_{17}GaN_8O$) exhibited an X-ray diffraction pattern as shown in FIG. 14 and the following results of elementary analysis. Further, as a result of the TG-GC/MS analysis (25–500° C.), the crystal exhibited 2840 ppm of naphthalene and 2.00% of N,N-dimethylformamide.

| Element | Calculated (%) | Measured (%) |
|---|---|---|
| C | 64.1 | 63.4 |
| H | 2.9 | 3.0 |
| N | 18.7 | 18.7 |
| Cl | 0.0 | 0.0 |

COMPARATIVE EXAMPLE 1

Figure 15:
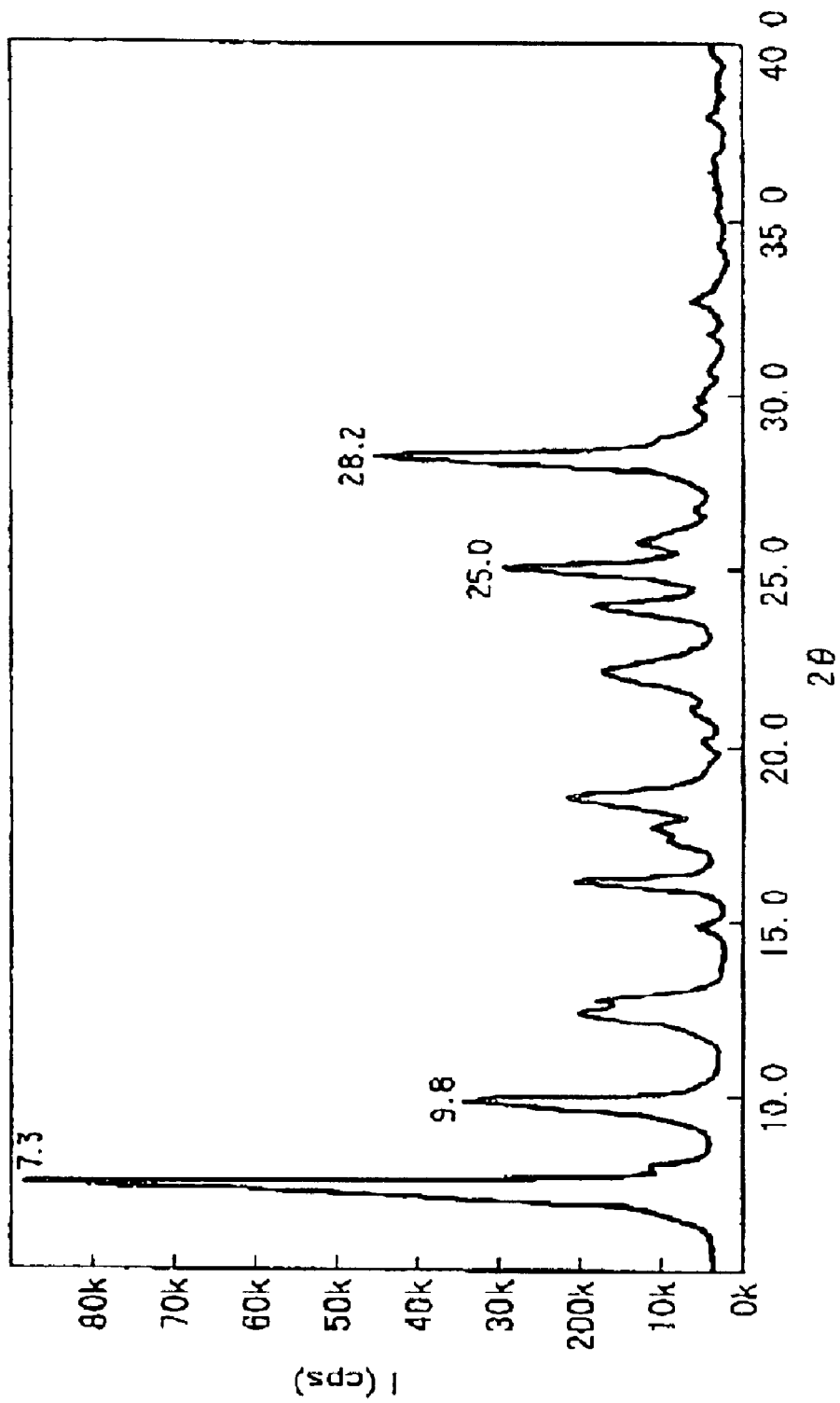
FIG. 15 is an X-ray diffraction chart of hydroxygallium phthalocyanine crystal obtained in Comparative Example 1.

The hydroxygallium phthalocyanine prepared in Synthesis Example 1 was subjected to milling and post-treatments similarly as in Example 3. The recovered hydroxygallium phthalocyanine crystal (represented by $C_{32}H_{17}GaN_8O$) exhibited an X-ray diffraction pattern as shown in FIG. 15 and the following results of elementary analysis. Further, as a result of the TG-GC/MS analysis (25–500° C.), the crystal exhibited 3.38% of N,N-dimethylformamide.

| Element | Calculated (%) | Measured (%) |
|---|---|---|
| C | 64.1 | 63.6 |
| H | 2.9 | 3.0 |
| N | 18.7 | 18.9 |
| Cl | 0.0 | 0.0 |

EXAMPLE 9

50 parts of titanium oxide powder coated with tin oxide containing 10% of antimony oxide, 25 parts of resol-type phenolic resin, 20 parts of methyl cellosolve, 5 parts of methanol and 0.002 part of silicone oil (polydimethylsiloxane-polyoxyalkylene copolymer, average molecular weight=3000), were dispersed for 2 hours in a sand mill containing 1 mm-dia. glass beads, to prepare an electroconductive paint. An aluminum cylinder (of 30 mm in diameter) was coated by dipping within the above-prepared electroconductive paint, followed by drying at 140° C. for 30 min. to form a 15 μm-thick electroconductive layer.

The aluminum cylinder was further coated by dipping within a solution of 5 parts of 6-66-610-12 quaternary polyamide copolymer resin in a solvent mixture of 70 parts of methanol and 25 parts of butanol, followed by drying, to form a 0.7 μm-thick undercoating layer.

Separately, 2.5 part of the gallium phthalocyanine crystal prepared in Example 3 and 1 part of polyvinyl butyral resin ("S-LEC BX-1", available from Sekisui Kagaku Kogyo K.K.), were added to 70 parts of cyclohexanone, and the mixture was subjected to 3 hours of dispersion in a sand mill containing 1 mm-dia. glass beads and then diluted with 100 parts of ethyl acetate to obtain a paint. The paint was applied by dipping onto the undercoating layer and dried at 120° C. for 10 min. to form a 0.2 μm-thick charge generation layer.

Then, 10 parts of a charge-transporting material of the following structural formula:

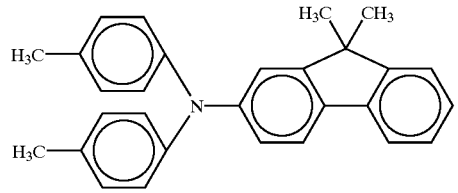

and 10 pats of polycarbonate resin ("IUPILON Z-200", available from Mitsubishi Gas Kagaku K.K.) were dissolved in 60 parts of monochlorobenzene to form a coating solution, which was then applied by dipping on the above-formed charge generation layer on the aluminum cylinder and dried at 120° C. for 60 min, to form a 17 μm-thick charge transport layer, thus providing an electrophotographic photosensitive member.

EXAMPLES 10–14

Five electrophotographic photosensitive members were prepared in the same manner as in Example 9 except that the gallium phthalocyanine crystal of Example 3 was replaced by the gallium phthalocyanine crystals of Examples 4–8, respectively.

COMPARATIVE EXAMPLE 2

A comparative electrophotographic photosensitive member was prepared in the same manner as in Example 9 except that the gallium phthalocyanine crystal of Example 3 was replaced by the gallium phthalocyanine crystal of Comparative Example 1.

Each of the electrophotographic photosensitive members prepared in Examples 9–14 and Comparative Example 2 was evaluated with respect to sensitivity and image defects of black spots and fog by incorporating it into a process cartridge of a commercially available laser beam printer ("LBP-1760", mfd. by Canon K.K.) and incorporating the process cartridge in the printer after remodeling for allowing light quantity change. The sensitivity measurement was performed by setting the charging condition so as to provide a dark-part potential of −600 volts and measuring a light quantity required for lowering the potential to −140 volts.

Then, the photosensitive member incorporated in the printer was subjected to evaluation of images formed at an initial stage in a high temperature/high humidity environment of 35° C./80% RH. The image evaluation was evaluated by the state of occurrence of image defects inclusive of black spots and fog due to charging failure according to the following standards.

A: No black spots or fog observed with eyes.

C: Black spots or fog observed with eyes.

The results of the evaluation are inclusively shown in the following Table 1.

TABLE 1

| Example | Sensitivity ($\mu J/cm^2$) | Image evaluation |
|---|---|---|
| 9 | 0.36 | A |
| 10 | 0.48 | A |
| 11 | 0.34 | A |
| 12 | 0.33 | A |
| 13 | 0.38 | A |
| 14 | 0.34 | A |
| Comp. 2 | 0.56 | C |

Each of the photosensitive members prepared in Examples 11, 12 and 14, and Comparative Example 2 (identical to those evaluated in the above test but in separately as-produced state) was incorporated in a process cartridge and then in a commercially available printer ("LBP-1760") (without the above remodeling) for measurement of a light-part potential (Vl) in an initial stage, a continuous image formation on 5000 sheets and measurement of a change in light-part potential ($\Delta|Vl|$) after the continuous image formation. The results are inclusively shown in Table 2 below. Incidentally, $\Delta|Vl|=+10$ volts means an increase in absolute value of the light-part potential (e.g., a change rom Vl=−180 volts to Vl=−190 volts).

TABLE 2

| Example | Initial V1 (volts) | $\Delta|V1|$ (volts) |
|---|---|---|
| 11 | −180 | +10 |
| 12 | −170 | +5 |
| 14 | −180 | +10 |
| Comp. 2 | −270 | +40 |

As described above, according to the present invention, a phthalocyanine crystal formed by doping a phthalocyanine compound with a minor mount of a substituted or unsubstituted condensed polycyclic hydrocarbon compound is provided, and by incorporating the phthalocyanine crystal in a photosensitive layer, it is possible to provide an electrophotographic photosensitive member exhibiting a high sensitivity in a semiconductor wavelength region and a potential stability in repetitive use, and further providing images with less image defects, particularly less black spots in a reversal development scheme.

What is claimed is:

1. A process for producing a phthalocyanine crystal comprising a phthalocyanine compound and a substituted or unsubstituted condensed polycyclic hydrocarbon compound, said process comprising subjecting a phthalocyanine compound to an acid pasting step including dissolving or dispersing the phthalocyanine compound in an acid which has been mixed with a substituted or unsubstituted condensed polycyclic hydrocarbon compound, the phthalocyanine compound being gallium phthalocyanine, the gallium phthalocyanine being hydroxgallium phthalocyanine, and having a crystal form characterized by strong peaks at Bragg angles 2θ of 7.4 deg.+0.2 deg. and 28.2 deg.+0.2 deg.

2. A process for producing a phthalocyanine crystal comprising a phthalocyanine compound and a substituted or unsubstituted condensed polycyclic hydrocarbon compound, said process comprising subjecting a phthalocyanine compound to an acid pasting step including dissolving or dispersing a phthalocyanine compound in an acid to form a mixture, and adding the mixture into a solution containing a substituted or unsubstituted condensed polycyclic hydrocarbon compound, the phthalocyanine compound being gallium phthalocyanine, the gallium phthalocyanine being hydroxgallium phthalocyanine, and having a crystal form characterized by strong peaks at Bragg angles 2θ of 7.4 deg.+0.2 deg. and 28.2 deg.+0.2 deg.

3. A process for producing a phthalocyanine crystal comprising a phthalocyanine compound and a substituted or unsubstituted condensed polycyclic hydrocarbon compound, said process comprising subjecting a crystal transformation step including milling a phthalocyanine compound within a solvent containing a substituted or unsubstituted condensed polycyclic hydrocarbon compound, the phthalocyanine compound being gallium phthalocyanine, the gallium phthalocyanine being hydroxgallium phthalocyanine, and having a crystal form characterized by strong peaks at Bragg angles 2θ of 7.4 deg.+0.2 deg. and 28.2 deg.+0.2 deg.

4. The process according to claim 1, wherein the substituted or unsubstituted condensed polycyclic hydrocarbon compound is a halo-substituted condensed polycyclic hydrocarbon compound.

5. The process according to claim 4, wherein the halo-substituted condensed polycyclic hydrocarbon compound is α-chloronaphthalene.

6. The process according to claim 1, wherein the substituted or unsubstituted condensed polycyclic hydrocarbon compound is naphthalene.

7. The process according to claim 2, wherein said substituted or unsubstituted condensed polycyclic hydrocarbon compound is a halo-substituted condensed polycyclic hydrocarbon compound.

8. The process according to claim 7, wherein the halo-substituted condensed polycyclic hydrocarbon compound is α-chloronaphthalene.

9. The process according to claim 2, wherein the substituted or unsubstituted condensed polycyclic hydrocarbon compound is napthalene.

10. The process according to claim 3, wherein the substituted or unsubstituted condensed polycyclic hydrocarbon compound is a halo-substituted condensed polycyclic hydrocarbon compound.

11. The process according to claim 10, wherein the halo-substituted condensed polycyclic hydrocarbon compound is α-chloronaphthalene.

12. The process according to claim 3, wherein the substituted or unsubstituted condensed polycyclic hydrocarbon compound is naphthalene.

13. The process according to claim 1, wherein the acid is concentrated sulfuric acid.

14. The process according to claim 1, wherein the acid is used in an amount of 10–40 times the weight of the phthalocyanine compound.

15. The process according to claim 1, wherein the phthalocyanine compound is dissolved in the acid at a temperature of at most 50° C.

16. The process according to claim 1, wherein said substituted or unsubstituted condensed polycyclic hydrocarbon compound is used in an amount of 0.01–2 times the weight of the phthalocyanine compound.

17. The process according to claim 2, wherein said acid is concentrated sulfuric acid.

18. The process according to claim 2, wherein the acid is used in a mount of 10–40 times the weight of the phthalocyanine compound.

19. The process according to claim 2, wherein the phthalocyanine compound is dissolved in the acid at a temperature of at most 50° C.

20. The process according to claim 2, wherein the substituted or unsubstituted condensed polycyclic hydrocarbon compound is used in a amount of 0.01–10 times the weight of the phthalocyanine compound.

21. The process according to claim 3, wherein the solvent is N,N-dimethyl formamide.

22. The process according to claim 3, wherein the solvent is used in an amount of 10–30 times the weight of the phthalocyanine compound.

23. The process according to claim 3, wherein the substituted or unsubstituted condensed polycyclic hydrocarbon compound is used in an amount of 0.01–3 times the weight of the phthalocyanine compound.

* * * * *

UNITED STATES PATENT AND TRADEMARK OFFICE
CERTIFICATE OF CORRECTION

PATENT NO. : 6,768,006 B2
DATED : July 27, 2004
INVENTOR(S) : Masato Tanaka et al.

It is certified that error appears in the above-identified patent and that said Letters Patent is hereby corrected as shown below:

Column 1,
Line 9, "Jan," should read -- Jan. --.
Line 30, "a" should read -- an --.
Line 35, "wide in" should read -- wide use in --.

Column 2,
Line 30, "used" should read -- use --.
Line 31, "backspots" should read -- black spots --.

Column 3,
Line 7, "hydrogallium" should read -- hydroxygallium --.

Column 4,
Line 27, "subjecting" should be deleted.

Column 5,
Line 10, "weigh" should read -- weight --.

Column 7,
Line 2, "respectively" should read -- respectively, --.

Column 12,
Line 31, "part" should read -- parts --.
Line 52, "pats" should read -- parts --.
Line 57, "min," should read -- min., --.

Column 13,
Lines 39 and 60, "Comp. 2" should read -- Comp. Ex. 2 --.

Column 14,
Line 17, "hydroxgallium" should read -- hydroxygallium --.
Lines 19-20, "Bragg angles 2θ of 7.4 deg. + 0.2 deg. and 28.2 deg. + 0.2 deg."
should read -- Bragg angles 2θ of 7.4 deg. ± 0.2 deg. and 28.2 deg. ± 0.2 deg. --.
Line 31, "hydroxgallium" should read -- hydroxygallium --.
Lines 32-33, "Bragg angles 2θ of 7.4 deg. + 0.2 deg. and 28.2 deg. + 0.2 deg."
should read -- Bragg angles 2θ of 7.4 deg. ± 0.2 deg. and 28.2 deg. ± 0.2 deg. --.
Line 37, "subjecting" should be deleted.
Line 42, "hydroxgallium" should read -- hydroxygallium --.
Lines 44-45, "Bragg angles 2θ of 7.4 deg. + 0.2 deg. and 28.2 deg. + 0.2 deg."
should read -- Bragg angles 2θ of 7.4 deg. ± 0.2 deg. and 28.2 deg. ± 0.2 deg. --.

UNITED STATES PATENT AND TRADEMARK OFFICE
CERTIFICATE OF CORRECTION

PATENT NO. : 6,768,006 B2
DATED : July 27, 2004
INVENTOR(S) : Masato Tanaka et al.

It is certified that error appears in the above-identified patent and that said Letters Patent is hereby corrected as shown below:

<u>Column 14, (cont.)</u>
Line 65, "napthalene" should read -- naphthalene --.

<u>Column 16,</u>
Lines 2 and 9, "a mount" should read -- an amount --.
Line 12, "N,N-dimethyl formamide" should read -- N,N-dimethyl formamide --.

Signed and Sealed this

Thirty-first Day of May, 2005

JON W. DUDAS
*Director of the United States Patent and Trademark Office*